US009218331B2

(12) United States Patent
Kimber et al.

(10) Patent No.: US 9,218,331 B2
(45) Date of Patent: Dec. 22, 2015

(54) AUTOMATED GENERATION OF STRUCTURED ELECTRONIC REPRESENTATIONS OF USER-FILLABLE FORMS

(71) Applicant: PatientOrderSets.com Ltd., Toronto (CA)

(72) Inventors: Ryan Kimber, Toronto (CA); Tommy Trinh, Toronto (CA); Alfred Wong, Toronto (CA)

(73) Assignee: PATIENTORDERSETS.COM LTD., Toronto (CA)

( * ) Notice: Subject to any disclaimer, the term of this patent is extended or adjusted under 35 U.S.C. 154(b) by 15 days.

(21) Appl. No.: 13/760,708

(22) Filed: Feb. 6, 2013

(65) Prior Publication Data
US 2014/0223277 A1 Aug. 7, 2014

(51) Int. Cl.
*G06F 17/00* (2006.01)
*G06F 17/24* (2006.01)
*G06F 17/22* (2006.01)

(52) U.S. Cl.
CPC .......... *G06F 17/243* (2013.01); *G06F 17/2247* (2013.01)

(58) Field of Classification Search
CPC ........................... G06F 17/243; G06F 17/2247
USPC .......... 715/222, 234, 235, 239, 249, 246, 221
See application file for complete search history.

(56) References Cited

U.S. PATENT DOCUMENTS

| 7,047,033 | B2 * | 5/2006 | Wyler | 455/552.1 |
| 7,607,078 | B2 * | 10/2009 | Geva et al. | 715/221 |
| 7,734,995 | B1 * | 6/2010 | Saikaly | 715/200 |
| 7,877,677 | B2 * | 1/2011 | Wyler et al. | 715/209 |
| 8,001,466 | B2 * | 8/2011 | Kobayashi | 715/243 |
| 8,060,818 | B2 * | 11/2011 | Wang et al. | 715/221 |
| 8,553,993 | B2 * | 10/2013 | Flesselles | 382/229 |
| 2006/0156266 | A1 * | 7/2006 | Alpert et al. | 716/13 |
| 2007/0130505 | A1 * | 6/2007 | Woods | 715/505 |
| 2009/0164244 | A1 * | 6/2009 | Helmus et al. | 705/2 |
| 2010/0318528 | A1 * | 12/2010 | Kupershmidt et al. | 707/756 |
| 2012/0011084 | A1 * | 1/2012 | Gulwani et al. | 706/12 |
| 2012/0047097 | A1 * | 2/2012 | Sengupta et al. | 706/12 |

* cited by examiner

*Primary Examiner* — Stephen Hong
*Assistant Examiner* — Matthew Ludwig

(57) ABSTRACT

Methods, software and devices for automatically constructing a structured electronic representation of a user-fillable form are disclosed. Each structured electronic representation is constructed from a parsable version of that form. A plurality of data structures for constructing structured electronic representations of user-fillable forms is stored. Each of the data structures is representative of a form region of one of a plurality of pre-defined types. A parsable version of the user-fillable form is received. This parsable version is parsed to identify fields of the user-fillable form, including at least one text field and at least one input field. These fields are grouped to form a plurality of form regions. Each of these form regions is matched to one of the stored data structures that best represents the form region in a structured electronic representation. An indicator of each matched data structure is stored.

26 Claims, 11 Drawing Sheets

Patient Order Sets

Community Acquired Pneumonia Admission Order Set

Antibiotic Therapy

☑ Administer first dose of antibiotics STAT after Blood C + S, if not administered in ER \*\*\*First antibiotics should be administered STAT after the Blood C + S if not already administered in ER\*\*\*

☐ Moxifloxacin 400 mg PO daily
☐ Moxifloxacin 400 mg IV daily

\*\*\*For patient from a nursing home or patient who has taken Fluoroquinolones in the previous 3 months, consider antibiotic regimen below\*\*\*

☐ cefTRIAXone 1 g IV q24h x 5 days
   AND
   Azithromycin 500 mg PO day 1
   THEN Azithromycin 250 mg PO daily x 4 days
Other: _____

For severely ill patient
☐ cefTRIAXone 1 g IV q24h x 5 days
   AND Moxifloxacin 400 mg IV daily
Other: _____

\*\*\*If concerned about nosocomial pneumonia, consider antibiotic regimen below\*\*\*
Piperacillin/Tazobactam 4.5 g IV q8h Other: _____

For patient with suspected gross aspiration
☐ Amoxicillin/Clavulanic Acid 875 mg/125 mg (combination tablet) PO q12h x 7 days
☐ metroNIDAZOLE 500 mg IV q12h x 48 hours and then reassess for conversion to PO
   ☑ Maintain NPO
   ☑ SLP assessment in a.m. to assess swallowing
Other: _____

FIG. 4

☑ Maintain NPO

FIG. 5

```
<contentBlock x="53.28" y="599.52" x2="180.42" y2="610.32" stringRepresentation="[CBX] Maintain NPO"/>
  <checkboxField x="53.28" y="599.52" x2="62.04" y2="608.28" defaultValue="On"/>
  <textField x ="66.40" y="599.52" x2="163.22" y2="610.32" stringRepresentation="Maintain"/>
  <textField x="166.02" y="599.52" x2="180.42" y2="610.32" stringRepresentation="NPO"/>
</contentBlock>
```

FIG. 6

| Set/Confirm Section Boundaries | | | | |
|---|---|---|---|---|
| Page 1 | | | | |
| Section | Left | Bottom | Right | Top |
| RIGHT_SIDEBAR | 554.0 | 105.0 | 612.0 | 640.0 |
| LEFT_SIDEBAR | 0.0 | 105.0 | 48.0 | 640.0 |
| FOOTER | 0.0 | 0.0 | 612.0 | 105.0 |
| BODY | 49.0 | 105.0 | 554.0 | 640.0 |
| HEADER | 49.0 | 640.0 | 612.0 | 792.0 |

Apply these values to all Pages

FIG. 8

Antibiotic Therapy

- ☑ Administer first dose of antibiotics STAT after Blood C + S, if not administered in ER
- ○ *First antibiotics should be administered STAT after the Blood C + S if not already administered in ER*
- ○ Moxifloxacin 400 mg PO daily
- ▦ or
- ○ Moxifloxacin 400 mg IV daily
- ○ *For patient from a nursing home or patient who has taken Fluoroquinolones in the previous 3 months, consider antibiotic regimen below* 
- □ cefTRIAXone 1 g IV q24h x 5 days AND Azithromycin 500 mg PO day 1 THEN Azithromycin 250 mg PO daily x 4 days
- Other: [TXT]

For severely ill patient
- □ cefTRIAXone 1 g IV q24h x 5 days AND Moxifloxacin 400 mg IV daily
- Other: [TXT]
- ○ *If concerned about nosocomial pneumonia, consider antibiotic regimen below*
- □ Piperacillin/Tazobactam 4.5 g IV q8h
- Other: [TXT]

For patient with suspected gross aspiration
- □ amoxicillin/Clavulanic Acid 875 mg/125 mg (combination tablet) PO q12h x 7 days
- □ metroNIDAZOLE 500 mg IV q12h x 48 hours and then reassess for conversion to PO
- [ ☑ Maintain NPO
- [ ☑ SLP assessment in a.m. to assess swallowing
- Other: [TXT]

*FIG. 9*

| [CBX] Maintain NPO | | |
|---|---|---|
| Location: | BODY | |
| Element Type: | Order ▼ | Scored as SUBORDER |
| Parent: | ▼ | Scored as "For patient with suspected gross aspiration" |
| Field(s) | | |
| # Type | Details | |
| 1 CHECKBOX ▼ | Default Value: 'On' | |

( Merge Content Blocks )  ( Split Content Block )

FIG. 10

```xml
<?xml version="1f.0" encoding="UTF-8"?>
<clinicalDocument id="1234" title="Community Acquired Pneumonia Admission Order Set">
    <modules>
        <module signature="Antibiotic Therapy">
            <sub-modules>
                <sub-module signature="For patient with suspected gross aspiration">
                    <orders>
                        <order signature="[CBX] Amoxicillin/Clavulanic Acid 875 mg/125 mg (combination tablet) PO q12h x 7 days">
                            <checkboxField x="53.28" y="298.2" x2="62.04" y2="306.96"/>
                        </order>
                        <order signature="[CBX] metroNIDAZOLE 500 mg IV q12h x 48 hours and then reassess for conversion to PO">
                            <checkboxField x="53.28" y="266.64" x2="62.04" y2="275.4"/>
                            <childOrders>
                                <order signature="[CBX] Maintain NPO">
                                    <checkboxField x="66.24" y="250.8" x2="75.0" y2="259.56" defaultValue="On"/>
                                </order>
                                <order signature="[CBX] SLP assessment in a.m. to assess swallowing">
                                    <checkboxField x="66.24" y="235.32" x2="75.0" y2="244.08" defaultValue="On"/>
                                </order>
                            </childOrders>
                        </order>
                        <order signature="Other: [TXT]">
                            <textField x="80.04" y="219.96" x2="544.92" y2="234.6" defaultValue=""/>
                        </order>
                    </orders>
                </sub-module>
            </submodules>
            ´
            .
            :
        </module>
        .
        .
        .
    </modules>
</clinicalDocument>
```

FIG. 11

AUTOMATED GENERATION OF STRUCTURED ELECTRONIC REPRESENTATIONS OF USER-FILLABLE FORMS

TECHNICAL FIELD

This relates to electronic document processing, and more particularly, to methods, software, and devices for generating structured electronic representations of user-fillable forms.

BACKGROUND

Most documents are structured to organize their contents. For example, a document may be structured to organize its contents into various regions, such as a table of contents, a body, an index, etc. The structure of some documents may be hierarchical, such that document regions are further divisible into sub-regions. For example, a document body may be divided into chapters, paragraphs, etc. Document structure may depend on document type and/or document contents.

With the proliferation of computers and electronic communication, documents are now commonly represented electronically. A typical electronic representation of a document includes data reflective of the documents contents. In some cases, an electronic representation of a document may include data reflective of the document's structure. Inclusion of data reflective of the document's structure facilitates automatic processing of that document. For example, a document's title may be automatically modified using structural data that identifies the title amongst the document's contents. Similarly, titles of two different documents may be automatically compared using structural data for those documents.

In recent years, one type of document that has become more commonly represented electronically is the patient order set. A patient order set is a form fillable by a doctor to prescribe a course of treatment for a hospital patient. A typical patient order form includes a multitude of treatment options, from which a doctor may select. Patient order sets are often structured to organize treatment options by treatment type, drug type, symptom type, patient type, etc. However, electronic representations of patient order sets typically do not include data reflective of such structure. Moreover, many organizations create their patient order sets using off-the-shelf word processing software which do not have the capability to process data reflective of such structure. As such, automatic processing of patient order sets, e.g., to modify or compare their contents, has been difficult.

SUMMARY

According to an embodiment, there is provided a computer-implemented method of constructing a structured electronic representation of a user-fillable form from a parsable version of the user-fillable form. The method comprises: storing a plurality of data structures for constructing structured electronic representations of user-fillable forms, each of the data structures representative of a form region of one of a plurality of pre-defined types; receiving a parsable version of the user-fillable form; parsing the parsable version to identify fields in the user-fillable form, the fields including at least one text field and at least one input field; and forming a plurality of form regions by grouping the fields in the user-fillable form. The method further comprises: for each of the plurality of form regions: matching that form region to a data structure of the plurality of data structures that best represents that form region in a structured electronic representation; and storing an indicator of the matched data structure.

According to another embodiment, there is provided a computer-readable medium storing instructions which when executed adapt a computing device to: store a plurality of data structures for constructing structured electronic representations of user-fillable forms, each of the data structures representative of a form region of one of a plurality of pre-defined types; receive a parsable version of the user-fillable form; parse the parsable version to identify fields in the user-fillable form, the fields including at least one text field and at least one input field; and form a plurality of form regions by grouping the fields in the user-fillable form. The instructions when executed further adapt the computing device to: for each of the plurality of form regions: match that form region to a data structure of the plurality of data structures that best represents that form region in a structured electronic representation; and store an indicator of the matched data structure.

According to yet another embodiment, there is provided a computing device for constructing a structured electronic representation of a user-fillable form from a parsable version of the user-fillable form. The computing device comprises at least one processor, memory in communication with the at least one processor, and software code stored in the memory. The software code when executed by the at least one processor causes the computing device to: store a plurality of data structures for constructing structured electronic representations of user-fillable forms, each of the data structures representative of a form region of one of a plurality of pre-defined types; receive a parsable version of the user-fillable form; parse the parsable version to identify fields in the user-fillable form, the fields including at least one text field and at least one input field; and form a plurality of form regions by grouping the fields in the user-fillable form. The software code when executed by the at least one processor further causes the computing device to, for each of the plurality of form regions: match that form region to a data structure of the plurality of data structures that best represents that form region in a structured electronic representation; and store an indicator of the matched data structure.

Other features will become apparent from the drawings in conjunction with the following description.

BRIEF DESCRIPTION OF THE DRAWINGS

In the figures, which illustrate example embodiments,

FIG. 4 illustrates an example form page;

FIG. 5 illustrates a region of the example form page of FIG. 4;

FIG. 6 illustrates a portion of an example XML document, representative of the form region of FIG. 5;

FIG. 8 illustrates an example user interface for modifying boundaries of form sections, presented by the adjusting module of FIG. 3;

FIG. 9 illustrates an example user interface containing a tree diagram representing form regions in the example form page of FIG. 4, presented by the adjusting module of FIG. 3;

FIG. 10 illustrates an example user interface for editing form regions, presented by the adjusting module of FIG. 3;

FIG. 11 illustrates a portion of an example XML document, generated by the generating module of FIG. 3, providing a structured representation of the example form page of FIG. 4.

DETAILED DESCRIPTION

Figure 1:
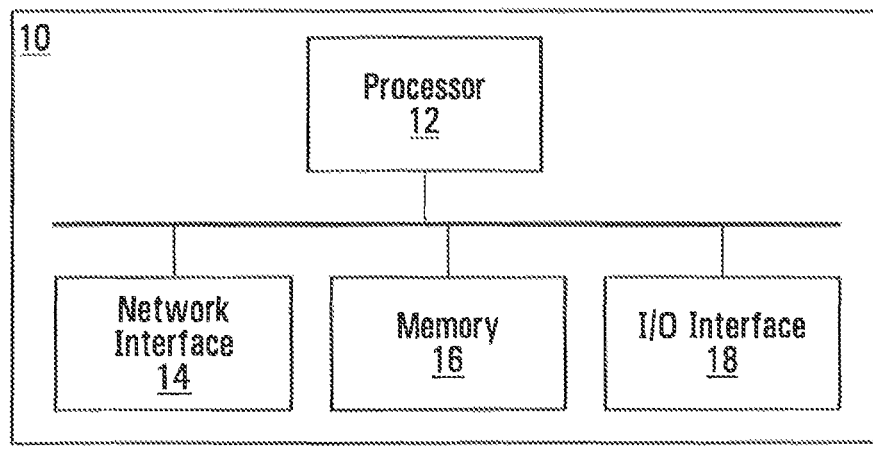
FIG. 1 is a high level block diagram of a computing device for generating structured electronic representations of user-fillable forms, exemplary of embodiments.

FIG. 1 is a high-level block diagram of computing device 10 operating as a device for generating structured electronic representations of user-fillable forms, exemplary of embodiments. As will become apparent, computing device 10 stores and executes software to adapt it to function in manners exemplary of embodiments.

As illustrated, computing device 10 includes processor 12, network interface 14, a suitable combination of persistent storage memory 16, random access memory and read only memory, and one or more I/O interfaces 18. Processor 12 may be an Intel x86, PowerPC, ARM processor or the like. Network interface 14 interconnects computing device 10 to a data network such a private local area network or the public Internet. Additional input/output peripherals such as a keyboard, monitor, mouse, scanner, printer and the like of computing device 10 are not specifically detailed herein. Computing device 10 may also include peripheral devices operable to load software into memory 16 from a computer-readable medium, for executing at computing device 10. Peripheral devices may be interconnected to computing device 10 by one or more I/O interfaces 18.

Figure 2:
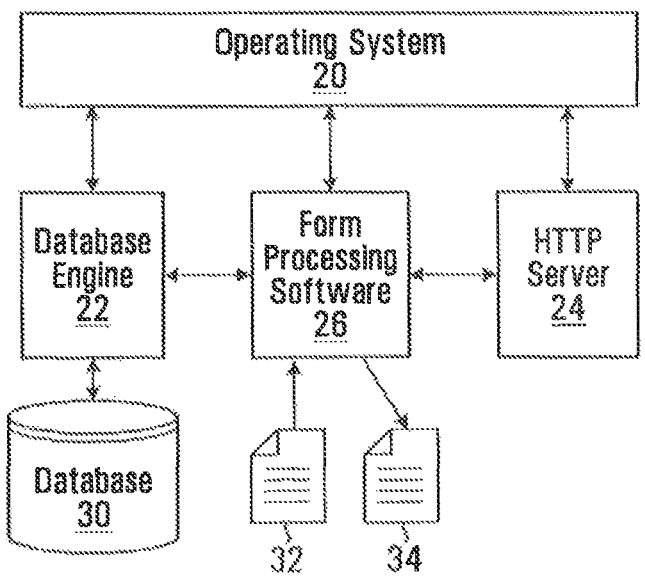
FIG. 2 illustrates example software organization of the computing device of FIG. 1.

FIG. 2 depicts a simplified organization of example software components stored within memory 16 of computing device 10. As illustrated, these software components include operating system (OS) software 20, database engine 22, database 30, hypertext transfer protocol (HTTP) server software 24, and form processing software 26. These software components, when executed, adapt computing device 10 to operate as a device for generating structured electronic representations 34 of user-fillable forms, exemplary of embodiments.

As depicted in FIG. 2 and further detailed below, form processing software 26 receives electronic representations 32 of user-fillable forms. Each electronic representation 32 stores data reflective of the contents of the represented user-fillable form, but stores insufficient data reflective of the structure of that form. Form processing software 26 processes each electronic representation 32 of a user-fillable form to generate a corresponding structured electronic representation 34 of that form.

OS software 20 may, for example, be a Unix-based operating system (e.g., Linux, FreeBSD, Solaris, OSX, etc.), a Microsoft Windows operating system or the like. OS software 20 allows form processing software 26 to access processor 12, network interface 14, memory 16 and one or more I/O interfaces 18 of computing device 10. OS software 20 may include a TCP/IP stack allowing computing device 10 to communicate with interconnected computing devices through network interface 14 using the TCP/IP protocol.

Database engine 22 may be a conventional relational or object-oriented database engine, such as Microsoft SQL Server, Oracle, DB2, Sybase, Pervasive, MongoDB, NoSQL, Hadoop or any other database engine known to those of ordinary skill in the art. Database engine 22 provides access to one or more databases 30, and thus typically includes an interface for interaction with OS software 20, and other software, such as form processing software 26. Database 30 may be a relational, object-oriented or document-oriented database. As will become apparent, database 30 stores data structures representative of different types of structural regions found in user-fillable forms, and also stores data reflective of past instances in which particular ones of those data structures have been used to represent particular structural regions.

HTTP server software 24 is a conventional HTTP web server application such as the Apache HTTP Server, nginx, Microsoft IIS or similar server application. HTTP server software 24 allows computing device 10 to act as a conventional HTTP server and provides a plurality of web pages for access by way of network-interconnected computing devices (not shown). Web pages may be implemented using traditional web languages such as HTML, XHTML, Java, Javascript, Ruby, Python, Perl, PHP, Flash or the like, and stored in memory 16 of computing device 10. HTTP server software 24 may also receive electronic representations 32 of user-fillable forms for processing by computing device 10, and may host structured electronic representations 34 of those user-fillable forms, as generated by form processing software 26.

Figure 3:
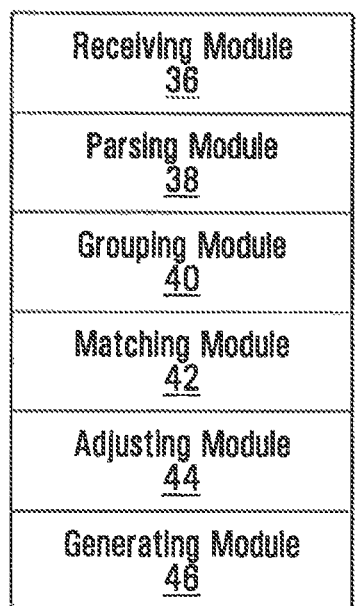
FIG. 3 is a high-level block diagram of the software modules of the form processing software of FIG. 2, executed at the computing device of FIG. 1.

In the embodiment shown in FIG. 3, form processing software 26 includes the following software modules: receiving module 36, parsing module 38, grouping module 40, matching module 42, adjusting module 44, and generating module 46. The functions of each of these software modules are detailed below.

These software modules may be written, for example, using conventional programming languages such as Java, J#, C, C++, C#, Perl, Visual Basic, Ruby, Scala, etc. These modules may additionally be written to use conventional web application frameworks such as the Java Servlet framework or the .NET Framework. Thus, the modules of form processing software 26 may be in the form of one or more executable programs, scripts, routines, statically/dynamically linkable libraries, or servlets.

In embodiments in which one or more software modules of form processing software 26 are in the form of servlets, HTTP server software 24 may communicate with an interconnected servlet server application (not shown) such Apache Tomcat, IBM WebSphere, Red Hat JBoss, or the like. The servlet server application executes servlets on behalf of HTTP server software 24 to extend the ability of HTTP server software 24 to respond to HTTP requests, such as a request to process an electronic representation 32 of a user-fillable form.

The software modules of form processing software 26 may include various user interfaces, as detailed below. These user interfaces may be written in a language allowing their presentation on a web browser, or code that will dynamically generate such user interfaces. As will be apparent, users of network-interconnected computing devices may interact with form processing software 26 by way of these user interfaces. These user interfaces may be provided in the form of web pages by way of HTTP server software 24 to network-interconnected computing devices.

FIG. 4 depicts one page of an exemplary user-fillable form. As illustrated, this user-fillable form is a patient order set usable by doctors to prescribe treatment for community-acquired pneumonia patients. The depicted page contains text detailing various treatment options, as well as input fields (checkboxes and text entry fields) to be filled by doctors when filling the form.

As depicted, the form page is structured into regions to organize its contents. For example, the page includes a region corresponding to a Title, namely, "Community Acquired Pneumonia Admission Order Set." The page also includes a region entitled "Antibiotic Therapy", which may be referred to as a Module. This Module includes a number of sub-regions each consisting of a checkbox accompanied by text, which may each be referred to as an Order. This module also includes two further sub-regions, respectively entitled "For severely ill patient" and "For patient with suspected gross aspiration". These sub-regions may each be referred to as a Sub-module. Like Modules, Sub-modules may also include Orders. Further, each Order may include one or more Sub-orders. For example, the Order having accompanying text "metroNIDAZOLE 500 mg . . . " includes two Sub-orders, respectively accompanied by text "Maintain NPO" and "SLP assessment in a.m. to assess swallowing."

The patient order set depicted in FIG. 4 may be represented by an electronic representation 32. However, while the electronic representation 32 may store data reflective the form's constituent text (as referred to as text fields) and input fields, the electronic representation 32 may store no data or insufficient data reflective of the form's structural regions, such as its Title, Modules, Sub-modules, Orders or Sub-orders.

Receiving module 36 receives electronic representations 32 of user-fillable forms for processing by form processing software 26. Receiving module 36 may receive each electronic representation 32 from memory 16, or from a computer-readable medium connected to an I/O interface 18, or through network Interface 14, e.g., by way of HTTP server software 24.

Receiving module 36 may include user interfaces configured to allow users to request processing of particular electronic representations 32. These user interfaces may be configured to allow users to provide receiving module 36 with indicators of particular electronic representation 32 to be processed (e.g., a URL), and/or copies of such electronic representations 32. In some embodiments, receiving module 36 may present these user interfaces to users directly operating computing device 10. In alternate embodiments, receiving module 36 may present these user interfaces to users operating network-connected computing devices, e.g., by way of HTTP server software 24.

Receiving module 36 receives each electronic representation 32 of a user-fillable form in a parsable format. This parsable format may include one or more electronic documents in Portable Document Format (PDF), Rich Text Format (RTF), Extensible Markup Language (XML) format, Hyper-Text Markup Language (HTML) format, Microsoft Word (DOC/DOCX) format or the like. This parsable format may also include one or more electronic messages, such as HTTP messages or the like.

Parsing module 38 parses each electronic representation 32 of a user-fillable form to determine the form's fields, including text fields and input fields. To this end, parsing module 38 may include one or more parsers such as a text field parser and an input field parser.

A text field parser identifies text fields in an electronic representation 32 of a user-fillable form. Each text field corresponds to a piece of text such as a phrase, a word, or a character. Text fields may include numbers, symbols, or any Unicode character. A text field parser may also identify properties of text fields, as detailed below.

An input field parser identifies input fields in an electronic representation 32 of a user-fillable form, such as text input fields for receiving textual data from users filling the form or checkbox fields which can be selected (checked) by such users. Other types of input fields known to those of ordinary skill in the art, such as date input fields, numerical input fields, radio selection boxes, drop-down selection boxes, multiple-choice boxes, etc., may also be identified. An input field parser may also identify the properties of input fields, as detailed below.

In some embodiments, a single parser may perform the functions of both a text field parser and an input field parser. For example, when electronic representation 32 is in the form of one or more PDF documents, PDFBox, distributed by the Apache Software Foundation, may be used as the text field parser and/or the input field parser.

In an embodiment, parsing module 38 creates a new PageElement object to correspond to each form field identified by parsing electronic representation 32. The PageElement class is a parent class to a number of subclasses including TextInputField, CheckboxField, and TextField. The particular subclass of each PageElement object created depends on the type of field identified. For example, each TextInputField object or CheckboxField object is created to correspond to an identified text input field or a checkbox field, respectively. Similarly, a TextField object is created to correspond to an Identified text field. PageElement objects of other subclasses may be created to correspond to other types of fields identified by parsing electronic representation 32, such as radio buttons, images, hyperlinks, etc.

Each PageElement object contains the parsed properties of the corresponding form field, such as x and y coordinates defining the location of the field on a form page. Other parsed properties may include font properties such as typeface, size or weight. Yet other parsed properties may include layout properties such as indentation, justification, line spacing, kerning, etc.

Parsing module 38 creates an UnstructuredDocument object containing one or more Page objects, wherein each Page object represents one page of the user-fillable form represented by electronic representation 32, e.g., as depicted in FIG. 4. Each Page object is populated with the PageElement objects corresponding to those form fields in the form page represented by that Page object.

Grouping module 40 groups form fields, as identified by parsing module 38. Form fields are grouped to correspond to structural regions in a user-fillable form. To this end, grouping module 40 creates a StructuredDocument object corresponding to the UnstructuredDocument object created by parsing module 38. The StructuredDocument object contains the PageElement objects of an UnstructuredDocument object, in which PageElement objects are grouped.

Like the UnstructuredDocument object, the StructuredDocument object contains Page objects. Each Page object in turn may contain Section objects and/or ContentBlock objects. Each Section object corresponds to a section of a form page such as the header, footer, body, left margin, right margin, etc. Boundaries for each section (header, footer, body, margins, etc.) may be pre-defined. Each Section object contains PageElement objects, corresponding to form field within the form section represented by that Section object. PageElement objects may be populated into Section objects based on their location on a page, as identified for example based on parsed x and y coordinates for each PageElement object.

Grouping module 40 groups PageElement objects into ContentBlock objects. Grouping is performed using the parsed properties of the PageElement objects, a set of Structural Rules and a business rule management system (BRMS) with a rules engine, such as JBoss Drools, ILOG JRules, FICO Blaze Advisor, or the like. The set of Structural Rules may include some or all of the following rules:

1) Combine a line starting with a TextField with a TextInputField beside it.

2) Combine a line starting with a TextField with a TextField beside it.

3) Combine a line starting with a CheckboxField with a TextField.

4) Combine a ContentBlock containing a Checkbox with a ContentBlock below containing only a TextInputField.

5) Combine a ContentBlock with a TextField to the right.

6) Combine a ContentBlock with a TextInputField to the right.

7) Combine TextFields Far From Previous ContentBlocks.

8) Combine a TextInputField with a PageElement to the right where a ContentBlock to the left has Larger font.

9) Combine a ContentBlock alone on a line with another ContentBlock alone on a line below if both are only include TextField.

10) Convert a TextField alone on a line into a ContentBlock.

11) Convert a TextInputField alone on a line to ContentBlock.

By applying the above set of Structural Rules to the PageElement objects in an UnstructuredDocument object, grouping module 40 groups PageElement objects into respective ContentBlock objects of a StructuredDocument object. Each ContentBlock object corresponds to a structural region of a user-fillable form. When the user-fillable form is a patient order set, each ContentBlock object may, for example, correspond to a Title, a Module, a Sub-module, an Order, or a Sub-order.

The above grouping rules are exemplary only, and other rules suitable for grouping patient order sets and/or other types of user-fillable forms will be readily apparent to those of ordinary skill in the art. Such other grouping rules may be used in conjunction with or in place of some or all of the above rules. Some embodiments may use an entirely different set of grouping rules altogether. In some embodiments, different grouping rules may be applied to different sections of a form. In some embodiments, grouping rules may be chosen based on the type of document being processed, the file format of the document, and/or the language of the document.

FIG. 5 depicts an excerpted Sub-order region of the example form page depicted in FIG. 4. As depicted, this region includes a checkbox input field, and two text fields: "Maintain" and "NPO". These fields may be respectively represented by a CheckboxField object and two TextField objects. These three objects may be grouped by grouping module 40 into a single ContentBlock object by applying the above Structural Rules.

Optionally, grouping module 40 may store a representation of the StructuredDocument object in memory 16. This representation may take the form of an XML document. FIG. 6 depicts a portion of an example XML document representative of a StructuredDocument object. The XML code depicted in FIG. 6 represents a ContentBlock object corresponding to the form region depicted in FIG. 5. As depicted in FIG. 6, the ContentBlock object is represented by a contentBlock tag. This contentBlock tag encloses a checkboxField tag and two textField tags, which respectively correspond to the checkbox input field and text fields shown in FIG. 5.

As noted, database 30 stores data structures representative of different types of structural regions found in user-fillable forms. These types of structural regions may vary according to the type of user-fillable form. For patient order sets, for example, five types of structural regions may be defined: Title, Module, Sub-module, Order, and Sub-order. To facilitate processing of electronic representations 32 of patient order sets, database 30 stores five data structures respectively representative of each of these five region types. These data structures may be stored in the form of object classes, XML tags or the like.

Other region types found in other types of user-fillable forms will be apparent to those of ordinary skill in the art. Data structures representative of these other region types may also be stored in database 30.

Database 30 also includes data reflective of the hierarchical relationship between region types. For example, a Sub-module is defined to be a sub-region of a Module, an Order is defined to be a sub-region of a Module or a Sub-module, a Sub-order is defined to be a sub-region of an Order, and so on.

Matching module 42 matches each ContentBlock object corresponding to a structural region of a user-fillable form to the data structures stored in database 30 that best represents that structural region. To this end, matching module 42 determines a quality of match between each ContentBlock object and each stored data structure.

Each quality of match may be represented by a numerical score. In an embodiment, each numerical match score has an initial value of zero, and is increased or decreased by applying a set of Scoring Rules. To apply Scoring Rules, matching module 42 may use a business rule management system (BRMS) with a rules engine, such as JBoss Drools, ILOG JRules, FICO Blaze Advisor, etc.

Figure 7:
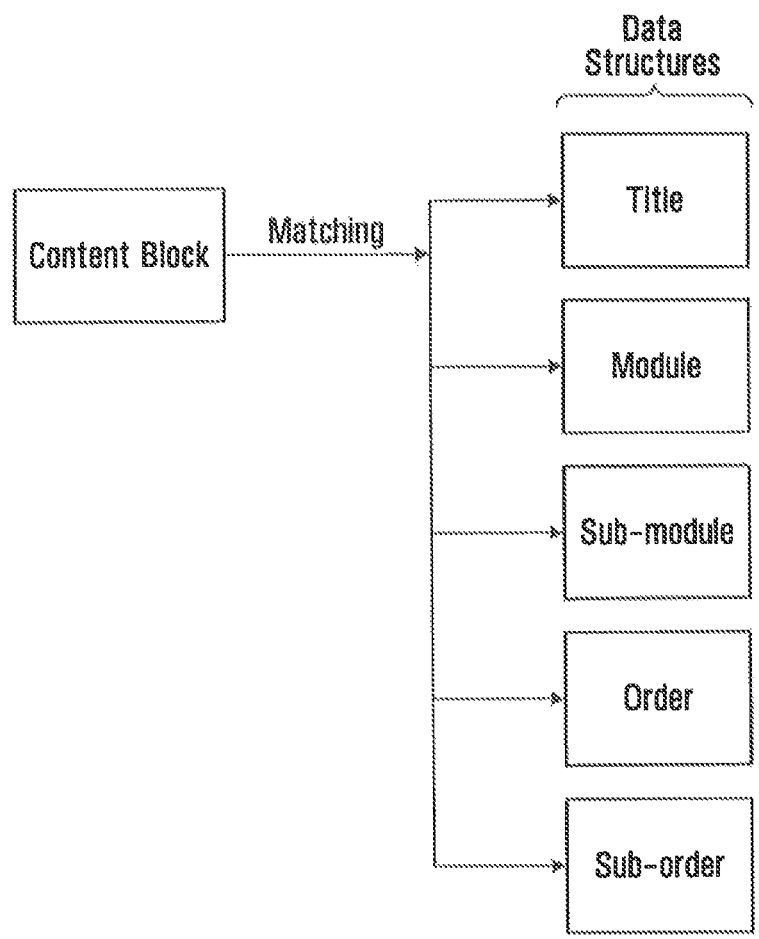
FIG. 7 schematically illustrates matching of a form region to stored data structures, performed by the matching module of FIG. 3.

The set of Scoring Rules may vary based on document type. The following Scoring Rules are exemplary rules that may be used to calculate numerical match scores between ContentBlock objects and data structures representative of structural regions found in patient order sets (viz. Title, Module, Sub-module, Order, Sub-order). FIG. 7 schematically illustrates matching of a ContentBlock object to one of these data structures.

The numerical match score between a ContentBlock object and the data structure representative of a Title is increased by one if the ContentBlock object: contains only letters;
    is centered;
    is bold;
    is in the header section of the document;
    has font size greater than 13; or
    was previously matched to the data structure representative of a Title either through automated scoring or manual user override.

The numerical match score between a ContentBlock object and the data structure representative of a Module is increased by one if the ContentBlock object: contains only letters;
    is centered;
    is bold;
    is in the body section of the document;
    has font size of 12; or
    was previously matched to the data structure representative of a Module either through automated scoring or manual user override.

The numerical match score between a ContentBlock object and the data structure representative of a Sub-module is increased by one if the ContentBlock object:
    contains only letters;
    is left justified;
    is bold;
    in the body section of the document;
    has font size of 11; or
    was previously matched to the data structure representative of a Sub-module either through automated scoring or manual user override.

The numerical match score between a ContentBlock object and the data structure representative of an Order is increased by one if the ContentBlock object;

contains a checkbox or text input field;
is left justified: or
was previously matched to the data structure representative of an Order either through automated scoring or manual user override.

The numerical match score between a ContentBlock object and the data structure representative of a Sub-order is increased by one if the ContentBlock object:
contains an input field such as a checkbox or text field;
is indented;
is preceded by a ContentBlock with a colon;
is preceded by a ContentBlock with an "OR"; or
was previously matched to the data structure representative of a Sub-order either through automated scoring or manual user override.

As can be seen from the above rules, the numerical match score may be calculated taking into account font properties, layout properties, the types of fields in the ContentBlock object, etc.

The above scoring rules are exemplary only, and other rules suitable for patient order sets and/or other types of user-fillable forms will be readily apparent to those of ordinary skill in the art. For example, although the above scoring rules increase the numerical match score between ContentBlock objects and stored data structures, some of such other scoring rules may decrease the numerical match score. Such other scoring rules may be used in conjunction with or in place of some or all of the above rules. Some embodiments may use an entirely different set of scoring rules altogether. In some embodiments, different scoring rules may be applied to different sections of a form. In some embodiments, scoring rules may be chosen based on the type of document being processed, the file format of the document, and/or the language of the document.

In applying the above Scoring Rules, each ContentBlock object is deemed to possess the characteristics of PageElement objects contained in that ContentBlock object. For example, a ContentBlock object is deemed to be in the body section of a document if its constituent PageElement objects are in the body section (i.e., contained in a body Section object). Similarly, a ContentBlock object is deemed to be bold if text in its constituent PageElement objects is bold.

To determine whether a ContentBlock object was previously matched to a particular data structure, matching module 42 generates a signature identifying the ContentBlock object. In an embodiment, the signature may be generated as a text string representative of the contents of the ContentBlock object. For example, the signature for the ContentBlock object of FIG. 6 may be generated as "[CBX] Maintain NPO". ContentBlocks objects with the same content may share the same signature. As will be appreciated, ContentBlock objects sharing a signature are more likely to be matched to the same stored data structure.

Using this signature, matching module 42 searches through records of past instances in which ContentBlock objects bearing the same signature have been matched to a particular data structure. In some embodiments, such records may be stored in database 30. The numerical match score for a ContentBlock object and a particular data structure may be increased by one for each recorded instance found. For example, if a ContentBlock object having a signature of "[CBX] Maintain NPO" has previously been matched to the data structure representative of Sub-orders in five instances, the numerical match score for the ContentBlock and the data structure representative of Sub-orders may be increased commensurately.

For each ContentBlock object, matching module 42 determines the stored data structure that best represents the structural region corresponding to that ContentBlock object based on the calculated numerical match scores. For example, matching module 42 may match each ContentBlock object to the stored data structure having the highest numerical match score.

To store matching results, matching module 42 creates a ScoredDocument object. This ScoredDocument object inherits the contents of the StructuredDocument object created by grouping module 40, and additionally includes an indicator of the data structure matched to each ContentBlock object. Each ScoredDocument object may also include the numerical matched scores for each ContentBlock object.

Adjusting module 44 allows users to modify the grouping results produced by grouping module 40 and the matching results produced by matching module 42. To this end, adjusting module 44 includes users interfaces configured to allow users to view and/or modify ScoredDocument objects. FIGS. 8-11 depict exemplary screens of user interfaces configured for this purpose. In some embodiments, adjusting module 44 may present these user interfaces to users directly operating computing device 10. In alternate embodiments, adjusting module 44 may present these user interfaces to users operating network-connected computing devices, e.g., by way of HTTP server software 24.

In particular, FIG. 8 illustrates an example user interface configured to allow a user to modify the defined boundaries of form sections (e.g., header, footer, body, margins, etc). These boundaries govern which Section object to which each PageElement object belongs, which is taken into account when calculating numerical match scores. As such, after section boundaries have been modified, numerical match scores may be re-calculated. Optionally, the user-defined section boundaries may be stored for future use, e.g., by grouping module 40 when populating Section objects with PageElement objects.

FIG. 9 illustrates an example user interface configured to contain a tree diagram showing ContentBlock objects. These ContentBlock objects correspond to the structural regions of the form page shown in FIG. 4. As depicted, these ContentBlock objects have been matched to data structures representative of particular form regions. For example, the tree diagram includes a ContentBlock object matched to a data structure representative of a Module (shown as Module "Antibiotic Therapy"). The tree diagram also includes ContentBlock objects respectively matched to data structures representative of two Sub-modules (shown as Sub-modules "For severely ill patient" and "For patient with suspected gross aspiration"). The illustrated tree diagram reflects the hierarchical structure of the form page shown in FIG. 4. Thus, for example, the two Sub-modules are shown to be sub-regions of the Module, in accordance with the defined hierarchical relationship between structural regions. The tree diagram also includes ContentBlock objects respectively matched to data structures representative of various Orders, and two Sub-orders shown as "Maintain NPO" and "SLP assessment in a.m. to assess swallowing". These two Sub-orders are shown to be sub-regions of their parent Order (shown as "metroNIDAZOLE 500 mg . . . ").

The ContentBlock objects contained in the tree diagram of FIG. 9 may be selected by a user, e.g., by way of a mouse click. Upon selecting a particular ContentBlock object, the example user interface shown in FIG. 10 may be presented to the user. This user interface is configured to allow a ContentBlock object, corresponding to a particular structural region, to be manually edited. As depicted, the selected Content- Block object may be merged with other ContentBlock objects. The selected ContentBlock object may also be split into its constituent PageElement objects. In this way, PageElement objects may be manually re-grouped to correspond to manually-identified structural regions.

The user interface shown in FIG. 10 is also configured to allow the matching result for a selected ContentBlock object to be manually overridden. For example, a ContentBlock object automatically matched by matching module 42 to a data structure representative of a Sub-order may be manually matched by way of this user interface to a data structure representative of an Order.

Adjusting module 44 modifies the ScoredDocument object based on modifications entered by users, e.g., by way of the above-described example user interfaces.

Adjusting module 44 may receive indicators from users that some or all of the grouping results or matching results are satisfactory.

Adjusting module 44 stores records of matches modified or confirmed by users. Each match is stored in association with a signature identifying the particular ContentBlock object. This signature may be generated in the manner described for matching module 42. Records of matches may be stored in database 30. These records of matches will be used by matching module 42 when processing future forms. Thus, matches modified or confirmed by users affect future scoring of ContentBlock objects. In this way, form processing software 26 learns from the matching results to improve future scoring.

Generating module 46 generates structured electronic representations 34 of user-fillable forms using the ScoredDocument object, as created by matching module 42 and as modified by adjusting module 44. Each structured electronic representation 34 of a user-fillable form may include one or more electronic documents. These electronic documents may, for example, be in XML, HTML, JSON or PDF format. Other parsable formats known to those of ordinary skill in the art may also be used.

The structured electronic representation may include an instance of each data structure matched to the ContentBlock objects contained in the ScoredDocument object. Each instance of one of these data structures may be populated with data reflective of the contents of the matched ContentBlock object. Such data may, for example, include data describing text fields and input fields, as represented by PageElement objects contained in the ContentBlock object.

FIG. 11 depicts an example structured representation 34 of the form page shown in FIG. 4. As depicted, this structural representation 34 is in XML format. The XML code includes matched data structures representative of each of the form page's structural regions. Each data structure takes the form of an XML tag. For example, a data structure in the form of a module tag represents the Module form region. Similarly, data structures in the form of sub-module tags represent the Sub-module form regions. Data structures in the form of order tags represent form regions corresponding to Orders and Sub-orders. Of these, order tags for Sub-orders are enclosed in a childOrders tag.

As depicted, the XML code also includes XML tags and tag properties reflective of the contents of each structural region (e.g., textual content, page coordinates, etc.). For each structural region, the XML code is generated by traversing the PageElement objects contained in the ContentBlock object that corresponds to that structural region.

In some embodiments, generating module 46 may store structural representations 34 in memory 16. In some embodiments, generating module 46 may provide structural representations 34 to users operating network-interconnected computing devices, e.g., by way of HTTP server software 24. Optionally, generating module 46 may include user interfaces configured to present structural representations 34 to such users, and/or allow such users to retrieve copies of structural representations 34 from computing device 10.

Structural representations 34 of user-fillable forms may be subsequently parsed to easily determine both the form's content and structure. This facilitates ready modification and/or comparison of such forms.

The operation of form processing software 26 is further described with reference to the flowchart illustrated in FIG. 12.

Figure 12:
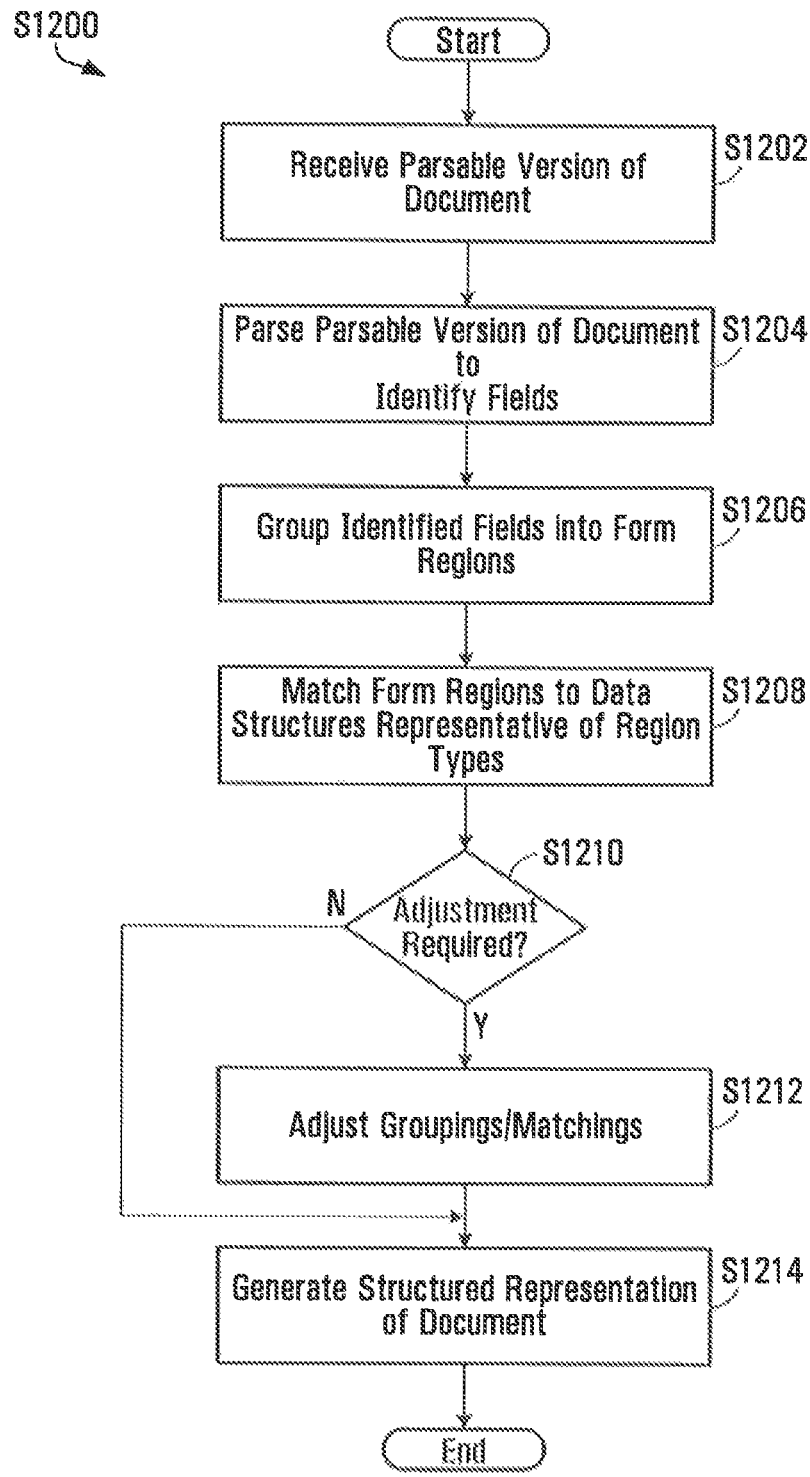
FIG. 12 is a flowchart depicting exemplary blocks performed by the form processing software of FIG. 2.

As depicted in FIG. 12, form processing software 26 performs blocks S1200 and onward at computing device 10. At block S1202, receiving module 36 of form processing software 26 receives an electronic representation 32 of a user-fillable form. Electronic representation 32 is a parsable version of that user-fillable form.

At block S1204, parsing module 38 of form processing software 26 parses electronic representation 32 to identify form fields. These form fields include both text fields and input fields. Parsed fields are each represented by a PageElement object, which are stored in an UnstructuredDocument object.

Next, at block S1026, grouping module 40 of form processing software 26 groups form fields in the user-fillable to correspond to the form's structural regions. To this end, grouping module 40 groups PageElement objects representative of these form fields into ContentBlock objects, with each ContentBlock object representative of one of the form's structural regions. Grouping is performed by applying a set of Structural Rules using a rules engine.

PageElement objects are also divided into Section objects, each corresponding to a section of a form page (e.g., header, footer, body, margins, etc.). ContentBlock objects and Section objects are stored in a StructuredDocument object. Optionally, grouping module 40 may store an electronic representation of the StructuredDocument object, as depicted for example in FIG. 6.

At block S1208, matching module 42 matches each form region (as represented by a ContentBlock object) to the stored data structure that best represents that form region. Matching is performed by calculating numerical match scores for each prospective match between a form region and one of the stored data structures. These numerical match scores are calculated by applying a set of Scoring Rules using a rules engine. A ScoredDocument object is created, which includes the contents of the StructuredDocument object and also the matching results, i.e., the stored data structure matched to each of the form regions.

Next, at block S1210, a determination is made whether grouping results obtained at block 81206 or matching results obtained at block 81210 should be manually reviewed and/or adjusted. This determination may be made by prompting a user, e.g., by presenting a prompt asking whether review/adjustment is required. Alternatively, this determination may be made according to pre-defined parameters. In some embodiments, manual review/adjustment is always required or is never required, and block 81210 may be omitted.

If manual review/adjustment is required, form processing software 26 performs block S1212. Otherwise, block S1212 is skipped and block 81214 is performed. At block S1212, adjusting module 44 of form processing software 26 presents user interfaces configured to allow the user to review and modify grouping results and matching results. Exemplary user interfaces are depicted in FIGS. 8-10. Adjusting module 44 may receive adjustments from the user to the grouping results and/or the matching results. Adjusting module 44 may receive confirmation from the user that the grouping results and/or the matching results are satisfactory. The ScoredDocument object is updated based on any adjustments received from the user.

At block S1214, generating module 46 of form processing software 26 uses the ScoredDocument object to generate structured electronic representation 34 of the user-fillable form, as depicted for example in FIG. 11. Finally, generating module 46 may provide a copy of structured electronic representation 34 to the user.

Of course, the above described embodiments are intended to be illustrative only and in no way limiting. The described embodiments are susceptible to many modifications of form, arrangement of parts, details and order of operation. For example, software (or components thereof) described at computing device 10 may be hosted at several devices. Software implemented in the modules described above could be using more or fewer modules. The invention is intended to encompass all such modification within its scope, as defined by the claims.

What is claimed:

1. A computer-implemented method of constructing a structured electronic representation of a given user-fillable form from a parsable version of said given user-finable form, said method comprising:
   storing a plurality of data structures each representative of a region of a pre-defined type of a user-fillable form in structured electronic representations of user-fillable forms;
   receiving a parsable version of said given user-fillable form;
   parsing said parsable version to identify fields in said parsable version of said given user-fillable form, said fields including at least one text field and at least one input field;
   grouping said fields to form a plurality of grouping results, each of said grouping results corresponding to a region of said given user-fillable form, and comprising one or more fields and data parsed from said parsable version;
   for each one of said plurality of grouping results:
      determining a quality of match between said one of said plurality of grouping results and each of said data structures;
      identifying one of said plurality of data structures having a highest quality of match between it and said one of said plurality of grouping results; and
   storing an indicator of said identified data structure having the highest quality of match between it and said one of said plurality of grouping results.

2. The method of claim 1, further comprising:
   for each grouping result of said plurality of grouping results, creating an instance of the identified data structure for said grouping result.

3. The method of claim 2, further comprising:
   for each of said plurality of grouping results, populating said instance of said identified data structure with said data parsed from said parsable version.

4. The method of claim 1, further comprising:
   generating a graphical representation of said user-fillable form depicting regions of said user-fillable form;
   presenting to an operator a graphical user interface comprising:
      said graphical representation; and
      for each grouping result of said plurality of Grouping results:
         an indication of the one or more fields comprising said grouping result; and
         the identified data structure for said grouping result.

5. The method of claim 4, wherein said graphical user interface is configured to allow said operator to modify grouping results by adding or removing a field.

6. The method of claim 4, wherein said graphical user interface is configured to allow said operator to modify the stored indicator of the identified data structure for one of said plurality of grouping results to indicate another data structure selected from said plurality of data structures.

7. The method of claim 4, further comprising:
   in response to said presenting, receiving confirmation from said operator that, for at least one grouping result of said plurality of grouping results, the identified data structure is correct.

8. The method of claim 7, further comprising:
   storing in a database an electronic record that the identified data structure of said at least one grouping result is confirmed by said operator to be correct.

9. The method of claim 8, wherein said electronic record includes an electronic signature generated to identify said at least one grouping result has been confirmed by said operator to be correct.

10. The method of claim 1, wherein said parsable version of said given user-fillable form stores characteristics of at least one of said fields, and said parsing comprises identifying said characteristics.

11. The method of claim 10, wherein said characteristics comprise page coordinates.

12. The method of claim 11, wherein said grouping is based at least on proximity of said fields, said proximity calculated from at least said page coordinates of said fields.

13. The method of claim 10, wherein said characteristics comprise font properties.

14. The method of claim 10, wherein said characteristics comprise layout properties.

15. The method of claim 10, wherein said characteristics comprise a type of one of said fields.

16. The method of claim 15, wherein said identifying a data structure takes into account a type of one of said fields.

17. The method of claim 10, wherein said identifying a data structure takes into account characteristics of said fields.

18. The method of claim 1, wherein said determining a quality of match between said one of said plurality of grouping results and each of said data structures comprises:
   calculating match metrics, indicating a quality of match between said one of said plurality of grouping results and each of said data structures.

19. The method of claim 1, wherein said identifying one of said plurality of data structures takes into account at least one stored electronic record of a previous match of a grouping result to said one of said plurality of data structures.

20. The method of claim 19, wherein said at least one stored electronic record is retrieved from a database using an electronic signature identifying said grouping result.

21. The method of claim 1, wherein said parsable version of said user-fillable form is received as one or more electronic documents.

22. The method of claim 21, wherein at least one of said electronic documents is a Portable Document Format (PDF) document, or a Hypertext Markup Language (HTML) document, or an Extensible Markup Language (XML) document, or a Microsoft Word document.

23. The method of claim 1, wherein said structured electronic representation of said user-fillable form is constructed as one or more electronic documents.

24. The method of claim 23, wherein at least one of said electronic documents is a Portable Document Format (PDF) document, or a Hypertext Markup Language (HTML) document, or an Extensible Markup Language (XML) document.

25. A computing device for constructing a structured electronic representation of a user-fillable form from a parsable version of said user-fillable form, said computing device comprising:
- at least one processor;
- memory in communication with said at least one processor, and
- software code stored in said memory, which when executed by said at least one processor causes said computing device to:
- store a plurality of data structures each representative of a region of a pre-defined type of a user-fillable form in structured electronic representations of user-fillable forms;
- receive a parsable version of said given user-fillable form;
- parse said parsable version to identify fields in said parsable version of said given user-finable form, said fields including at least one text field and at least one input field;
- group said fields to form a plurality of grouping results, each grouping result corresponding to a region of said given user-fillable form, each said grouping results comprising one or more fields and data parsed from said parsable version for said one or more fields;
- for each one of said plurality of grouping results:
  - determine a quality of match between said one of said plurality of grouping results and each of said data structures;
- identify one of said plurality of data structures having a highest quality of match between it and said one of said plurality of grouping results; and
- store an indicator of said identified data structure having the highest quality of match between it and said one of said plurality of grouping results.

26. A non-transitory computer-readable storage medium storing instructions which when executed adapt a computing device to:
- store a plurality of data structures each representative of a region of a pre-defined type of a user-fillable form in structured electronic representations of user-fillable forms;
- receive a parsable version of a given user-fillable form;
- parse said parsable version to identify fields in said parsable version of said given user-fillable form, said fields including at least one text field and at least one input field;
- grouping said fields to form a plurality of grouping results, each grouping result corresponding to a region of said given user-fillable form, and comprising one or more fields and data parsed from said parsable version for said one or more fields;
- for each one of said plurality of grouping results:
  - determine a quality of match between said one of said plurality of grouping results and each of said data structures;
- identify one of said plurality of data structures having a highest quality of match between it and said one of said plurality of grouping results; and
- store an indicator of said identified data structure having the highest quality of match between it and said one of said plurality of grouping results.

* * * * *

UNITED STATES PATENT AND TRADEMARK OFFICE
CERTIFICATE OF CORRECTION

PATENT NO. : 9,218,331 B2
APPLICATION NO. : 13/760708
DATED : December 22, 2015
INVENTOR(S) : Ryan Kimber et al.

It is certified that error appears in the above-identified patent and that said Letters Patent is hereby corrected as shown below:

In the claims

Claim 1, column 13, line 26 "user-finable" should read --user-fillable--

Claim 4, column 13, line 66 "Grouping" should read --grouping--

Claim 25, column 15, line 11 "processor," should read --processor--

Claim 25, column 15, line 22 "user-finable" should read --user-fillable--

Signed and Sealed this
Fifth Day of July, 2016

Michelle K. Lee
*Director of the United States Patent and Trademark Office*